(12) United States Patent
Lindenfelser

(10) Patent No.: US 6,565,712 B2
(45) Date of Patent: May 20, 2003

(54) COMPOSITE

(75) Inventor: Peter Lindenfelser, Guilford, CT (US)

(73) Assignee: Lingol Corporation, Wallingford, CT (US)

( * ) Notice: Subject to any disclaimer, the term of this patent is extended or adjusted under 35 U.S.C. 154(b) by 0 days.

(21) Appl. No.: 09/859,772

(22) Filed: May 17, 2001

(65) Prior Publication Data

US 2002/0179271 A1 Dec. 5, 2002

(51) Int. Cl.⁷ .............................. B31F 1/12; B31F 1/29
(52) U.S. Cl. ................. 162/281; 15/256.51; 118/261; 118/413; 428/102; 428/113; 428/260
(58) Field of Search ............... 162/281; 15/256.51; 118/261, 413; 428/102, 113, 260, 36, 114

(56) References Cited

U.S. PATENT DOCUMENTS

| | | | |
|---|---|---|---|
| 3,014,533 A | 12/1961 | Moore, Jr. | |
| 3,065,486 A | 11/1962 | Scott | |
| 3,869,344 A | 3/1975 | Hunt | |
| 4,173,670 A | 11/1979 | VanAuken | |
| 4,324,613 A | 4/1982 | Wahren | |
| 4,549,933 A | 10/1985 | Judd et al. | |
| 4,735,144 A | 4/1988 | Jenkins | |
| 4,841,558 A | 6/1989 | Kaneko et al. | |
| 4,861,855 A | * 8/1989 | Bockrath et al. | ............ 528/125 |
| 4,945,832 A | 8/1990 | Odom | |
| 4,957,045 A | 9/1990 | Messerschmitt | |
| 4,978,999 A | 12/1990 | Frankel et al. | |
| 5,031,528 A | 7/1991 | Messerschmitt | |
| 5,078,061 A | 1/1992 | Messerschmitt | |
| 5,110,415 A | 5/1992 | Boucher et al. | |
| 5,117,264 A | 5/1992 | Frankel et al. | |
| 5,153,657 A | 10/1992 | Yu et al. | |
| 5,237,375 A | 8/1993 | Michlin et al. | |
| 5,264,060 A | 11/1993 | Lambing et al. | |
| 5,283,098 A | 2/1994 | Matsubara | |
| 5,408,720 A | 4/1995 | Miles | |
| 5,824,154 A | 10/1998 | Freti | |
| 6,053,979 A | 4/2000 | Bernert et al. | |
| 6,109,174 A | 8/2000 | Giard | |

FOREIGN PATENT DOCUMENTS

| | | |
|---|---|---|
| WO | PCT/WO99/12726 | 3/1999 |
| WO | WO 01/28766 | 10/1999 |

OTHER PUBLICATIONS

Search Report for PCT/US02/15715 dated Sep. 27, 2002.

* cited by examiner

Primary Examiner—Steven P. Griffin
Assistant Examiner—M. Halpern
(74) Attorney, Agent, or Firm—Wiggin & Dana LLP

(57) ABSTRACT

A composite composition to be used in a doctor blade construction, said composite laminate construction comprising: (a) one or more central layers comprising an engineering thermoplastic resin filled with heat-resistant, non-glass, long strand fibers; (b) one or more intermediate layers positioned over the one or more central layers, each said intermediate layer comprising a carbon layer; and (c) one or more surface sheets positioned over the one or more intermediate layers.

22 Claims, No Drawings

COMPOSITE

BACKGROUND OF THE INVENTION

1. Field of the Invention

The present invention relates to a composite composition to be used in a doctor blade construction. In particular, this invention relates to a composite composition used in a doctor blade construction wherein the composition has one or more inner layers comprising an engineering thermoplastic resin filled with heat-resistant, non-glass, long-strand fibers (e.g., carbon fibers or aramid fibers); one or more intermediate layers of carbon; and one or more outer layers of surface sheeting.

2. Brief Description of Art

Doctor blades contact the surface of rotating rolls of papermaking machines for various purposes, such as roll cleaning and sheet shedding. Conventional doctor blades have been made of a wide variety of materials including metals and various composites.

Composites have been used for making doctor blades in paper-making plants for many years. Generally, these composites have consisted of two parts, a substrate and a bonding agent for laminating together the layers of substrate. The commonly employed substrate materials have been paper, cotton fabric, glass fabric, finely woven or non-woven carbon fiber, unidirectional carbon layer or tape and synthetic fabrics. The latter includes polyesters, nylon, and acrylics. The commonly used bonding agents have generally been thermoset plastics such as phenolics or epoxies.

There are several particular challenges in selecting a suitable combination of substrates and bonding agents. First, bonding agents having better heat resistance are more likely to give poor inter-laminar bond strength. Secondly, bonding agents having both good water resistance and good chemical resistance generally have poor inter-laminar bond strength. Third, thinner doctor blade construction is preferred over thicker materials, but stiffer substrates most suitable for thinner constructions (e.g. fiberglass) may be too abrasive and thus are more apt to damage the rolls upon which the doctor blade operates. Accordingly, the selection of a proper composite for a doctor blade has been difficult and is, in many cases, application-specific.

U.S. Pat. No. 4,549,933 that issued to Judd et al. on Oct. 29, 1985 describes a composite doctor blade having a plurality of juxtaposed fibrous layers that are encapsulated in an epoxy resin. These fibrous layers include a fibrous core surrounded by a intermediate unidirectional graphite layer and then outer fibrous layers. A critical feature of the invention covered by this patent is that the intermediate unidirectional graphite layers must be oriented in the machine direction. This patent is incorporated herein by reference in its entirety.

In recent years, some engineering thermoplastic resins have been used as the bonding agent in doctor blades. These have good inter-laminar bond with good heat resistance. They also lend themselves to supporting long strand substrate fibers better than common thermoplastics such as polyethylene and polypropylene.

Some substrates that are useful with phenolic or epoxy-type bonding agents are not always useful with engineering thermoplastic resins because of the relative high processing temperatures needed to convert these latter resins into composites. For example, substrates such as cotton, paper, and some synthetic fibers (e.g. polyesters) may burn or melt when processed with certain engineering thermoplastic resins to make composites.

The substrates previously used with the engineering thermoplastic resins have been either glass fibers and/or carbon (e.g. woven fibers or unidirectional layers). Glass fiber substrates are not always favored because they are subject to water absorption and can be very abrasive to some materials. Accordingly, doctor blades containing glass fibers have been limited to use on the dry end of paper-making machines and can not be used on the wet end of the paper-making machines where softer rolls may be damaged.

Composites using only unidirectional carbon layers as the substrate, while being very stiff and wear resistant, are sometimes very difficult to conform to the shape of the roll. Accordingly, they may take an unreasonably long time to conform to the roll upon which they operate. During that break-in time, the doctor blade and the paper-making machine do not operate as efficiently as desired.

Most recently, unidirectional carbon layers, woven polyester fabric and an epoxy bonding resin have been combined to make a thin doctor blade for the use on the wet end of the machine. While this combination is stiff yet non-abrasive, it has a limited use because of its susceptibility to water, heat and chemical attack.

BRIEF SUMMARY OF THE INVENTION

Therefore, one aspect of the present invention is directed to a composite composition to be used in a doctor blade construction, said composite composition comprising:

(a) one or more central layers comprising an engineering thermoplastic resin filled with heat-resistant, non-glass, long strand fibers;

(b) one or more intermediate layers positioned over the one or more central layers, each said intermediate layer comprising at least one carbon layer; and (c) one or more surface sheets positioned over the one or more intermediate layers.

Another aspect of the present invention is directed to an elongated doctor blade construction having a side edge structured for application to a roll surface in a paper making machine, said blade comprising a composite as defined above.

The composite composition of the present invention has several important advantages over the composite compositions previously used for doctor blades. This present composite will more quickly conform to the shape of the rolls in a paper-making operation than a composite containing all unidirectional carbon substrate, yet will wear for a desirably long time so that replacements are not frequently needed. This present composite also avoids the use of abrasive fiberglass that, when used in doctor blades, may cause wear on the rolls. Furthermore, the present composite has more water resistance than composite laminates that employ fiberglass and has more chemical resistance than composites containing epoxy resins. The composite compositions of the present invention may also be made into doctor blade constructions that have reasonable overall thickness (e.g. from about 0.008 to 0.2 inches in thickness) so that undesirable high torques and excess power losses are not needed to operate these blade constructions. Also, the doctoring edge of these composite doctor blades of the present invention may be sufficiently stiff in the machine direction so they do not easily deflect outwardly during operation, thus preventing the material that is being doctored to work its way between the blade and the roll surface being doctored.

Furthermore, the heat resistant nature of the materials in the present composite blade construction will not degrade or lose stiffness or develop blisters when operating at the elevated temperatures (e.g. about 70–100° C.) normally associated with the wet end of a paper-making operation.

DETAILED DESCRIPTION OF THE PREFERRED EMBODIMENTS OF THE INVENTION

The term "composite" as used in the present specification and claims is defined as a material created by the synthetic assembly of two or more materials including a selected filler or reinforcing elements (also referred to as a "substrate") and compatible matrix binder (also referred to as a "bonding agent") to obtain specific characteristics and properties useful in a doctor blade construction. It is preferable to use an advanced composite composition for the present invention that contains both an engineering thermoplastic resin bonding agent matrix and reinforcement elements both having unusually high performance properties.

The term "laminate" as used in the present specification and claims is defined as a preferred composite construction made by bonding multiple flat layers or sheets of substrate material with a bonding agent, usually in combination with pressure and heat, into composite composition.

The term "engineering thermoplastic resin" as used in the present specification and claims is defined as a thermoplastic resin having a combination of exceptional strength, heat resistance, low water absorbance and chemical resistance.

Engineering thermoplastic resins used in the present invention do not include conventional thermoplastic resins such as polyethylenes, polypropylenes, polystyrenes and polyesters. Generally, the engineering thermoplastic resins have relatively high melting points (e.g. above about 200° C.) suitable for making doctor blade constructions. In contrast, polyethylenes and polypropylenes do not have sufficient heat resistance, toughness, stiffness, and good bonding properties to be desirable resins for preparing doctor blades. Engineering thermoplastic resins suitable for the present invention also generally have a low absorption of less than 0.5%, preferably less than 0.3% by weight. These engineering thermoplastic resins also preferably have flexural strengths from about 5,000 to about 30,000 p.s.i. and flexural modulus from about 300 to about 2000 $10^3$ p.s.i. The flexural strength and flexural modulus are not critical parameters for determining whether a resin is an engineering thermoplastic resin of the present invention.

The preferred engineering thermoplastic resins include polyphenylene sulfide (PPS); polyether ether ketone (PEEK); polyphenylene oxide; polyether imide; and polyimide. These engineering thermoplastic resins exhibit sufficient heat resistance, toughness, stiffness, hot water resistance, chemical resistance and good bonding properties to be desirable resins for preparing doctor blades.

The following Table 1 describes representative published physical properties (i.e. from Modern Plastics Handbook McGraw-Hill 2000) of these resins that make them useful for this application.

TABLE 1

| Resin | Melting Point (° C.) | Flexural Strength[1] (p.s.i.) | Flexural Modulus[2] ($10^3$ p.s.i.) | Water Absorbance[3] (% @ 24 hr) |
|---|---|---|---|---|
| Polyphenylene Sulfide | 285–290 | 14,000–21,000 | 550–600 | 0.01–0.07 |
| Polyether Ether Ketone | 324 | 24,500 | 2000 | 0.1–0.4 |
| Polyphenylene Oxide* (Polystyrene Modified) | — | 8,300–12,800 | 325–400 | 0.06–0.1 |
| Polyether Imide | 340–425 | 22,000 | 480 | 0.25 |
| Polyimide | 388 | 10,000–28,800 | 360–500 | 0.24–0.34 |

The following Table 2 describes representative published physical properties (i.e. from Modern Plastics Handbook McGraw-Hill 2000) of these resins filled with 30% by weight long strand carbon fibers.

TABLE 2

| Resin | Melting Point (° C.) | Flexural Strength[1] (p.s.i.) | Flexural Modulus[2] ($10^3$ p.s.i.) | Water Absorbance[3] (% @ 24 hrs) |
|---|---|---|---|---|
| Polyphenylene Sulfide | 275–285 | 26,000–36,000 | 2,450–3,300 | 0.01–0.02 |
| Polyether Ether Ketone | — | 40,000 | 10,000 | 0.2 |
| Polyphenylene Oxide* (Polystyrene Modified) | — | 24,000 | 1,100 | 0.4 |
| Polyether Imide | — | 37,000–45,000 | 2,500–2,600 | 0.18–0.2 |
| Polyimide | — | 43,600 | 3,210 | — |

[1]Flexural strength is measured according to ASTM test method D-790.
[2]Flexural modules is measured according to ASTM test method D-790.
[3]Water absorption is measured according to ASTM test method D-570.
*Polyphenylene oxide usually has some minor portions of polystyrene blended with it as an aid to processing.

The preferred engineering thermoplastic resin is polyphenylene sulfide because of its relatively high melting point (i.e. it has very good heat resistance), chemical resistance (ie, very few materials chemically attack it), and its very low water absorbance.

The term "heat resistant" as used in the phrase "strand fibers" in the present specification and claims is defined as the property or ability of a fiber to not melt at the processing temperatures of the engineering thermoplastic resin in which it is contained.

The term "non-glass" as used in the phrase "heat resistant, non-glass, long-strand fibers" in the present specification and claims is defined as the property wherein no significant quantities of glass fibers, quartz or ceramic fibers are contained therein, so that the composite will not cause any undesirable abrasion to the rolls in the paper machine.

The term "long strand" as used in the phrase "heat-resistant, non-glass, long-strand fibers" in the present specification and claims is defined as where the minimum length of the fibers is at least about 0.25 inch, (e.g. preferably, a minimum of about 0.50 inch). The material in unidirectional carbon layers is not included in this definition of "long-strand".

The phrase "heat-resistant, non-glass, long-strand fibers" as used in the present specification and claims is defined as fibers that have the combination of "heat-resistant", "non-glass" and "long-strand" properties as just defined.

Each resulting resin/filler layer preferably contains from about 35% to about 95% by resin and about 65% to about 5% by weight filler. Of course, the most desired percentages for a specific center layer will depend upon the particular resin and filler materials employed and the particular application for which the composite will be used.

The preferred heat-resistant, non-glass long-strand fibers are carbon fibers. These materials have significantly lower water absorbancy than glass fibers and cause lower abrasion to metal rolls in the end of a wet paper making machines than glass fibers. Other suitable heat-resistant, non-glass long-strand fibers are aramid fibers that are compatible with the engineering thermoplastic resin used.

The center layers of the composite compositions of the present invention contain both at least one engineering thermoplastic resin and at least one type of heat-resistant, non-glass, long strand fibers. These resin/filler center layers may be made by several different techniques. One preferred method of making each layer is to stack a sheet of non-woven carbon fiber with one sheet of engineering thermoplastic fiber or between two sheets of engineering thermoplastic resin while compressing and heating the total composite composition together to form a laminate construction. Alternatively, each of these layers may be pre-made before the overall composite composition is made, preferably compressed and heated together, to form a laminate. The number of these center layers is not critical. One, two, or three resin/filler center layers made from engineering thermoplastic resin and filler may be suitable.

Also, it may be desirable to place other materials between these center layers. For example, it may be desirable to place one or more unidirectional carbon layers or woven carbon fibers or mixtures thereof in the center of the composite sandwiched by two or three center layers of the engineering thermoplastic resin/filler. The intermediate carbon layers and the outer surface sheeting will then be positioned over and under to sandwich this center portion of the composite.

Each center resin/filler layer, if prepared by stacking, is most preferably formed by laying a thin sheet of non-woven carbon fiber between two sheets of engineering thermoplastic resin. The thickness of the non-woven carbon fiber layer is preferably from about 0.004 to about 0.030 inches. The preferred thickness of each engineering thermoplastic resin is from about 0.002 to about 0.025 inches. When this overall composite composition is compressed and heated together to form a laminate, the non-woven carbon will be displaced into the resin sheet or sheets to form a resulting center layer. The resulting overall thickness of each center layer will be little more than the original thickness of the sheet or sheets of engineering thermoplastic resins. In an alternative method, it may be desirable to use pre-made center layer or layers wherein the filler and resin has been extruded or laminated together into a simple sheet of material. The resulting thickness of the center layer will then remain the same when all of the laminate layers are heated and compressed together. In still another embodiment, one or more center layers of resin/filler are laid above and one or more center layers of resin/filler are laid below one or more layers of unidirectional carbon or woven carbon (which is then the center line of overall composite). In this latter case, the sandwiched non-woven carbon will be displaced into the resin films and the overall thickness of the center portion of the composite will be substantially equal to the sum of the (1) thickness of the resin film sheets on one side of the center unidirectional carbon or woven carbon sheets; (2) the thickness of the center unidirectional carbon or woven carbon sheets and (3) the thickness of the resin film sheets on the other side of the center unidirectional carbon sheets. These center unidirectional carbon or woven carbon sheets may be laid either in the machine direction (MD) or at any angle cross or against the machine direction (CMD). The preferred direction will depend on the direction of the intermediate carbon fibers and the specific construction of the roll to be doctored.

The intermediate portion of the composites of the present invention is made from at least one sheet or layer of carbon. The carbon is preferably either an unidirectional carbon layer or a woven carbon fiber or mixtures thereof. The most preferred intermediate layer of the composite of the present invention include at least one layer of unidirectional carbon. The direction of each of these unidirectional carbon layers is not critical. They may include layers in machine direction and layers in cross machine direction (90 degrees from machine direction) or any angle in between (e.g. 45 degrees or 135 degrees). The terms "machine direction" and "cross machine direction" as used in the present specification and claims have the same definitions as shown in U.S. Pat. No. 4,549,933 (Judd et al.) discussed above. Preferably, each of these unidirectional carbon intermediate layers is composed of unidirectional carbon in an engineering thermoplastic resin matrix. The percentage of carbon in each such layer is preferably from about 30% to about 70% by weight and the amount of resin is thus preferably about 70% to about 30% by weight. The desired weight will depend upon the particular resin employed and the amount of unidirectional carbon desired.

For one preferred embodiment, it is preferred to use from 2 to 5 sheets of intermediate unidirectional carbon wherein each unidirectional carbon sheet is laid down so that direction of carbon in that sheet is at a different angle than the other carbon layers (i.e., a non-parallel fashion). For example, it may be desirable to lay one carbon layer in the machine direction and one carbon layer in the cross machine direction 90° perpendicular to the machine direction (CMD). The use of multiple non-parallel sheets of unidirectional carbon layers gives added strength. If multiple unidirectional carbon layers are used, there should preferably be a balance of all of the angles employed. Alternatively, it may be preferred in some applications to use only a single sheet or layer of unidirectional carbon fiber as the intermediate portion. In either case, that intermediate layer would preferably have a thickness of about 0.003 to about 0.030 inches thick.

The outer portion of the composite is one or more surface sheetings. These are preferably laid over so as to sandwich the intermediate carbon layers. The surface sheetings aid in maintaining the integrity of the intermediate carbon layers (i.e. help prevent unidirectional carbon fiber sheets from breaking apart). The preferable surface sheeting materials are either finely woven carbon or non-woven carbon sheets. These sheets are relative thin (e.g. they are usually less than 0.008 inches thick).

Preferably, it may be desirable to place at least one sheet of engineering thermoplastic resin in contact with at least one of the surface sheetings. This engineering thermoplastic resin sheet may preferably be either (1) in between the intermediate carbon layers or surface sheetings; (2) positioned over the surface sheetings; or (3) positioned between two surface sheetings. Most preferably, it is desirable to position this sheet or sheets of engineering thermoplastic resin over the surface sheeting (so the resin sheets are on the outside of the composite) in order to better ensure that the surface sheetings do not work themselves free from the rest of the composite and give the overall composite composition a smooth resin-rich surface, if desired.

In an alternative embodiment, it maybe desirable to pre-make a surface sheeting/resin combination wherein the resin saturates the surface sheeting material. This resin-saturated surface sheeting is then applied to the other components of the composite instead of an unsaturated surface sheeting. In any event, the term "surface sheeting" as used in the present specification and claims is defined both unsaturated and resin-saturated materials.

The composite compositions of the present invention, after the individual layers have been laid together, is then compressed by simultaneously heating and compressing in a heated hydraulic press to form a desired composite. The use of a heated hydraulic press for this purpose is well known by those ordinarily skilled in this art and it would be obvious to select the optimum temperature and pressure conditions without undue experimentation. Alternatively, the various layers of the composite compositions of the present invention may be pressed together by placing weights on the stacked layers and then heating that weighted assembly in autoclave to form a unitary composite. Again, the processing conditions of this technique are also well known to those in this art and do not require undue experimentation to make a suitable composite. Besides these two well known composite-making techniques, other conventional processes may be alternatively used.

The preferred overall thickness of the composite compositions of the present invention may wary from about 0.008 to 0.2 inches, depending upon the numbers and types of layers used; the specific materials used; and the amount of compression used.

One of the preferred constructions of the present composite is a five (5) layer composite wherein the layers are arranged, top (1) to bottom (5) as follows:

(1) One or more surface sheeting (sometimes referred to as a veil);
(2) At least one intermediate unidirectional carbon layer or sheet;
(3) At least one center engineering thermoplastic resin layer filled with heat-resistance, non-glass, long strand fibers;
(4) At least one unidirectional carbon layer or sheet;
(5) At least one surface sheeting (or veil).

Another preferred construction is a seven (7) layer composite wherein the layers are arranged, top (1) to bottom (7) as follows:

(1) One or more surface sheeting (or veil);
(2) At least one intermediate unidirectional carbon layer or sheets;
(3) At least one engineering thermoplastic resin/heat-resistant, non-glass, long strand fiber layer;
(4) At least one center unidirectional carbon layer or sheet;
(5) At least one engineering themoplastic resin/heat-resistance, non-glass, long strand fiber layer;
(6) At least one intermediate unidirectional carbon layer or sheets;
(7) One or more surface sheeting (or veil).

The center unidirectional layer (4) in this latter construction is useful to provide additional reinforcement to the composite as well as provide thermal stability to the composite core and provide better distribution of stress in flex. Preferably, the carbon material in this center unidirectional layer will run perpendicular (i.e., also referred to as cross machine direction or CMD) to the fiber direction (also known as machine direction or MC) of the outer unidirectional carbon layers to provide better stability.

Still another preferred composite is a nine (9) layer composite wherein the layers are arranged, top (1) to bottom (9), as follows:

(1) One or more outer surface sheets (or veils);
(2) At least one intermediate unidirectional carbon layer or sheet;
(3) At least one engineering thermoplastic resin layer filled with heat-resistant, non-glass, long strand fibers;
(4) At least one unidirectional carbon layer or sheet;
(5) At least one center engineering thermoplastic resin layer filled with heat-resistant, non-glass, long strand fibers;
(6) At least one unidirectional layer or carbon sheet;
(7) At least one engineering thermoplastic resin layers filled with heat-resistant, non-glass long strand fibers;
(8) At least one intermediate unidirectional carbon sheet; and
(9) At least one surface sheeting (or veil).

This particular nine or more layer construction provides a means for making relatively thick composite-type doctor blades wherein the individual layers will more likely wear evenly.

Instead of using only unidirectional carbon layers as the intermediate portions of the above-noted three preferred embodiments, it may be desirable on some instances to use woven carbon or combinations of unidirectional carbon fiber and woven carbon. Accordingly, other preferred embodiments would be the same as the above-noted three preferred embodiments except for that substitution.

The central layers, intermediate layers and surface sheeting layers as described above are all preferably elongated sheets (i.e., lengths are longer than widths) so as to form an elongated composite that are bound together by the engineering thermoplastic resin. preferably these layers are coextensive and superposed one on the other to form a sandwich structure in the same fashion as described in U.S. Pat. No. 4,549,933 (Judd et al.).

Once the composite of the present invention is made, they can be converted into doctor blades used in papermaking operations according to well-known methods. For example, note U.S. Pat. No. 4,549,933 as one illustration how this could be done. Also, the composites as described above may be cut to size, edges shaped, and fabricated (e.g. holes punched in them or rivets or studs added) so as to fit in a doctor blade holder. Doctor blades of the present invention may be used to doctor different materials on various types of rolls, including rolls made of metal, rubber, granite and other composition materials. The elongated doctor blade is generally fastened to a structural beam which is adjustably supported across the paper-making machine on which a blade holder and the replaceable doctor blade are positioned. The elongated doctor blade comes into direct contact with the roll surface so as to scrape off any contaminants from the roll surface or to shed a sheet.

The doctor blades of the present invention may be employed in both wet-end or dry-end areas of a paper-making plant.

The present invention is further described in detail by means of the following Examples and Comparisons. All parts and percentages are by weight and all temperatures are degrees Celsius unless explicitly stated otherwise.

EXAMPLE 1

The following layers or films of material were stacked together, then heated and compressed together to form a composite composition that could be used as a doctor blade. The layers or films are number 1 for the top layer and number 7 for the bottom layer.

1. Polyphenylene sulfide film (0.006 inches thick)
2. Non-woven carbon sheet (17 grams per square meter density)
3. Unidirectional carbon tape (sheet of unidirectional carbon in polyphenylene sulfide resin—47% carbon/53% resin)(machine direction)(0.007 inches thick)
4. Polyphenylene sulfide resin film filled with 8.8% long strand carbon fiber (0.022 inches thick)
5. Unidirectional carbon tape (sheet of unidirectional carbon in polyphenylene sulfide resin—47% carbon/53% resin)(machine direction)(0.007 inches thick)
6. Non-woven carbon sheet (17 grams per square foot density)
7. Polyphenylene sulfide film (0.006 inches thick)

Layers 2 and 6 are the surface sheeting layers. Layers 3 and 5 are the intermediate carbon layers. Layer 4 is the center layer.

After these layers have been stacked, they were compressed together in a heated flat bed press in a heat and pressure cycle to melt and flow the polyphenylene sulfide resin films. At these pressures and temperatures, the polyphenylene sulfide films melt into the adjacent layers and thereby bind the layers together forming a laminated composite structure. The resulting composite is then removed from the press and then cut into sections suitable for use as doctor blades.

While the invention has been described above with reference to specific embodiments thereof, it is apparent that many changes, modifications, and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A composite composition to be used in a doctor blade construction, said composite construction comprising:
   (a) one or more central layers comprising an engineering thermoplastic resin filled with heat-resistant, non-glass, long-strand fibers;
   (b) one or more intermediate layers positioned over the one or more central layers, each said intermediate layer comprising a carbon layer; and
   (c) one or more surface sheets positioned over the one or more intermediate layers.

2. The composite composition of claim 1 wherein the heat-resistant, non-glass, long-strand fibers are non-woven carbon fibers.

3. The composite composition of claim 1 wherein the heat resistant, non-glass, long strand fibers are aramid fibers.

4. The composite composition of claim 1 wherein the one or more surface sheets are one or more layers of finely woven carbon fibers or non-woven carbon fibers.

5. The composite composition of claim 1 wherein the engineering thermoplastic resin is selected from the group consisting of at least one of polyphenylene sulfide; polyether ether ketone; polyphenylene oxide; polyether imide; polyimide, and mixtures thereof.

6. The composite composition of claim 5 wherein the engineering thermoplastic resin is polyphenylene sulfide.

7. The composite composition of claim 1 wherein the carbon layer in one or more intermediate layers is at least one unidirectional carbon layer or at least one woven carbon fiber layer.

8. The composite composition of claim 7 wherein the at least one intermediate carbon layer is multiple non-parallel sheets of unidirectional carbon.

9. The composite composition of claim 1 wherein the composite composition is made from five layers arranged, top (1) to bottom (5) as follows:
   (1) one or more surface sheeting;
   (2) at least one intermediate unidirectional carbon layer or woven carbon sheet;
   (3) at least one center engineering thermoplastic resin sheet filled with heat-resistance, non-glass, long-strand fibers;
   (4) at least one intermediate unidirectional carbon layer or woven carbon sheet; and
   (5) one or more surface sheeting.

10. The composite composition of claim 1 wherein the composite composition is made of seven layers arranged top (1) to bottom (7) as follows:
    (1) one or more surface sheeting;
    (2) at least one intermediate unidirectional carbon layer or woven carbon sheet;
    (3) at least one combined engineering thermoplastic resin sheets filled with heat-resistant, non-glass, long strand fiber;
    (4) at least one center unidirectional carbon layer or woven carbon sheet;
    (5) at least one engineering thermoplastic resin sheet filled with heat-resistant, non-glass, long strand fibers;
    (6) at least one intermediate unidirectional carbon layer or woven carbon sheet; and
    (7) one or more surface sheeting.

11. The composite composition of claim 1 where the composite composition is a nine (9) layer composite wherein the layers are arranged, top (1) to bottom (9) as follows:
    (1) one or more outer surface sheets;
    (2) at least one intermediate unidirectional carbon layer or woven carbon sheet;
    (3) at least one engineering thermoplastic resin layer filled with heat-resistant, non-glass, long strand fibers;
    (4) at least one unidirectional carbon sheet;
    (5) at least one center engineering thermoplastic resin layer filled with heat-resistant, non-glass, long-strand fibers;
    (6) at least one unidirectional carbon sheet;
    (7) at least one engineering thermoplastic resin layer filled with heat-resistant, non-glass long strand fibers;
    (8) at least one intermediate unidirectional carbon layer or woven carbon sheet; and
    (9) at least one surface sheeting.

12. The composite composition of claim 1 wherein the one or more central layers comprise from about 35% to about 95% by weight resin and about 65% to about 5% by weight filler.

13. The composite composition of claim 1 wherein at least one of the surface sheets are in contact with a film of engineering thermoplastic resin.

14. A composite composition to be used in a doctor blade construction, said composite construction composing:
    (a) one or more central layers comprising polyphenylene sulfide filled with heat-resistant, non-glass, long-strand fibers selected from the group consisting of non-woven carbon fibers and aramid fibers;
    (b) one or more intermediate layers, each said intermediate layer comprising a unidirectional carbon layer or a woven carbon layer encapsulated in polyphenylene sulfide resin;

(c) one or more surface sheets positioned over the one or more intermediate layers, said surface sheets comprising non-woven carbon or finely woven carbon; and (d) one or more films of polyphenylene sulfide in contact with at least one of the surface sheets.

15. The composite composition of claim 14 wherein the heat-resistant, non-glass, long-strand fibers are non-woven carbon fibers.

16. The composite composition of claim 15 wherein the non-woven carbon fibers in the one or more central layers have a minimum length of about 0.50 inches.

17. The composite composition of claim 15 wherein the one or more intermediate layers comprise multiple non-parallel sheets of unidirectional carbon layers.

18. The composite composition claim 17 wherein the one or more surface sheets comprise non-woven carbon.

19. An elongated doctor blade construction having a side edge structured for application to a roll surface in a paper-making machine, said blade comprising a composite composition of claim 1.

20. An elongated doctor blade construction having a side edge structured for application to a roll surface in a paper-making machine, said blade comprising a composite composition of claim 14.

21. The composite composition of claim 1 wherein one or more sheets of engineering thermoplastic resin are positioned over the surface sheets.

22. The composite composition of claim 14 wherein the (d) one or more films of polyphenylene sulfide in contact with at least one of the surface sheets are positioned over the surface sheets.

* * * * *